US011139466B2

(12) United States Patent
Nishio et al.

(10) Patent No.: US 11,139,466 B2
(45) Date of Patent: Oct. 5, 2021

(54) SECONDARY-BATTERY ELECTRODE AND SECONDARY-BATTERY ELECTRODE MANUFACTURING METHOD, AND SECONDARY BATTERY AND METHOD OF MANUFACTURING SECONDARY BATTERY

(71) Applicant: SANYO Electric Co., Ltd., Daito (JP)

(72) Inventors: Kazuya Nishio, Hyogo (JP); Tetsuya Sato, Hyogo (JP); Mituhiro Yosinaga, Osaka (JP)

(73) Assignee: SANYO Electric Co., Ltd., Daito (JP)

(*) Notice: Subject to any disclaimer, the term of this patent is extended or adjusted under 35 U.S.C. 154(b) by 206 days.

(21) Appl. No.: 16/328,000

(22) PCT Filed: Aug. 29, 2017

(86) PCT No.: PCT/JP2017/030828
§ 371 (c)(1),
(2) Date: Feb. 25, 2019

(87) PCT Pub. No.: WO2018/043444
PCT Pub. Date: Mar. 8, 2018

(65) Prior Publication Data
US 2019/0198860 A1 Jun. 27, 2019

(30) Foreign Application Priority Data
Aug. 31, 2016 (JP) .............................. JP2016-170077

(51) Int. Cl.
H01M 4/70 (2006.01)
H01M 4/139 (2010.01)
(Continued)

(52) U.S. Cl.
CPC ............. H01M 4/139 (2013.01); B23K 26/38 (2013.01); H01M 4/02 (2013.01); H01M 4/04 (2013.01);
(Continued)

(58) Field of Classification Search
CPC .... H01M 4/00; H01M 4/02; H01M 2004/021; H01M 10/00; H01M 10/02
See application file for complete search history.

(56) References Cited

U.S. PATENT DOCUMENTS

2010/0028767 A1 2/2010 Inose et al.
2015/0017523 A1* 1/2015 Hirai .................. H01M 4/70
429/211
2016/0036009 A1* 2/2016 Cho .................... B23K 26/082
429/179

FOREIGN PATENT DOCUMENTS

JP 2001-176501 A 6/2001
JP 2002-343342 A 11/2002
(Continued)

OTHER PUBLICATIONS

Office Action dated Jul. 28, 2020, issued in counterpart JP Application No. 2016-170077, with English translation (7 pages).
(Continued)

Primary Examiner — Christina Chern
(74) Attorney, Agent, or Firm — Westerman, Hattori, Daniels & Adrian, LLP

(57) ABSTRACT

An object is to provide a secondary-battery electrode that is capable of suppressing a short circuit between adjacent positive and negative electrodes when the secondary-battery electrode is applied to an electrode body of a secondary battery. A secondary-battery electrode (10) includes a thin-plate-shaped metal core body (11) and an active material layer (12a, 12b) containing an active material and formed on two surfaces of the core body (11). In a cut end portion (15) of the electrode, an end portion (16) of the core body (11) is positioned inward of an end portion (17a, 17b) of the active material layer (12a, 12b) in a surface direction Y of the electrode.

6 Claims, 7 Drawing Sheets

(51) Int. Cl.
  *B23K 26/38* (2014.01)
  *H01M 4/04* (2006.01)
  *H01M 4/02* (2006.01)
  *H01M 50/531* (2021.01)
  *H01M 10/0525* (2010.01)
  *B23K 101/36* (2006.01)

(52) U.S. Cl.
  CPC ......... *H01M 4/70* (2013.01); *H01M 10/0525* (2013.01); *H01M 50/531* (2021.01); *B23K 2101/36* (2018.08); *H01M 2004/021* (2013.01)

(56) References Cited

FOREIGN PATENT DOCUMENTS

| | | |
|---|---|---|
| JP | 2002-373649 A | 12/2002 |
| JP | 2007-14993 A | 1/2007 |
| JP | 2010-34009 A | 2/2010 |
| JP | 2011-198692 A | 10/2011 |
| JP | 2012-221912 A | 11/2012 |
| JP | 2013-98022 A | 5/2013 |
| JP | 2014-226706 A | 12/2014 |
| JP | 2015-188908 A | 11/2015 |
| JP | 2016-031836 A | 3/2016 |
| JP | 2017-112208 A | 6/2017 |
| WO | 2017/072898 A1 | 5/2017 |

OTHER PUBLICATIONS

International Search Report dated Nov. 7, 2017, issued in counterpart application No. PCT/JP2017/030828 (2 pages).

\* cited by examiner

SECONDARY-BATTERY ELECTRODE AND SECONDARY-BATTERY ELECTRODE MANUFACTURING METHOD, AND SECONDARY BATTERY AND METHOD OF MANUFACTURING SECONDARY BATTERY

TECHNICAL FIELD

The present disclosure relates to a secondary-battery electrode and a secondary-battery electrode manufacturing method, and a secondary battery and a method of manufacturing the secondary battery.

BACKGROUND ART

Electrodes used in secondary batteries have been manufactured, for example, by, after forming an active material layer on a long core body, cutting the core body into a predetermined shape and cutting the core body into individual electrode sizes. Patent Documents 1 and 2 each disclose a technology of cutting a long electrode precursor into a predetermined shape by using a laser. Patent Documents 1 and 2 each describe the use of a pulsed-system laser oscillator.

CITATION LIST

Patent Document

Patent Document 1: Japanese Published Unexamined Patent Application No. 2010-34009
Patent Document 2: Japanese Published Unexamined Patent Application No. 2007-14993

SUMMARY OF INVENTION

Technical Problem

As described in Patent Documents 1 and 2, when electrodes used in secondary batteries are formed by cutting with a pulsed-system laser, the core body is formed in an outwardly protruded state at a cut end portion. Therefore, when, for example, a multilayer-type electrode body of a secondary battery is formed by using such electrodes, a short circuit tends to occur between positive and negative electrodes because the core body protrudes outward at the cut end portion.

Solution to Problem

A secondary-battery electrode according to the present disclosure comprises a thin-plate-shaped core body and an active material layer formed on at least one surface of the core body, wherein, at an end portion of the electrode, an end portion of the core body is positioned inward of an end portion of the active material layer in a surface direction of the electrode or is flush with the end portion of the active material layer.

A secondary-battery electrode manufacturing method according to the present disclosure comprises a first step of cutting an electrode precursor by a first continuous wave laser, the electrode precursor including a thin-plate-shaped long core body that becomes a core body of a secondary-battery electrode, and an active material layer formed on at least one surface of the long core body; and a second step of removing a protrusion of the active material layer by a second continuous wave laser, the protrusion being formed on a corner portion of a cut end portion of the electrode precursor that has been cut by the first continuous wave laser.

Advantageous Effects of Invention

According to the secondary-battery electrode according to the present disclosure, when the secondary-battery electrode is applied to the electrode body of the secondary battery, it is possible to suppress a short circuit between adjacent positive and negative electrodes at cut end portions of the electrodes.

DESCRIPTION OF EMBODIMENTS

Figure 1:
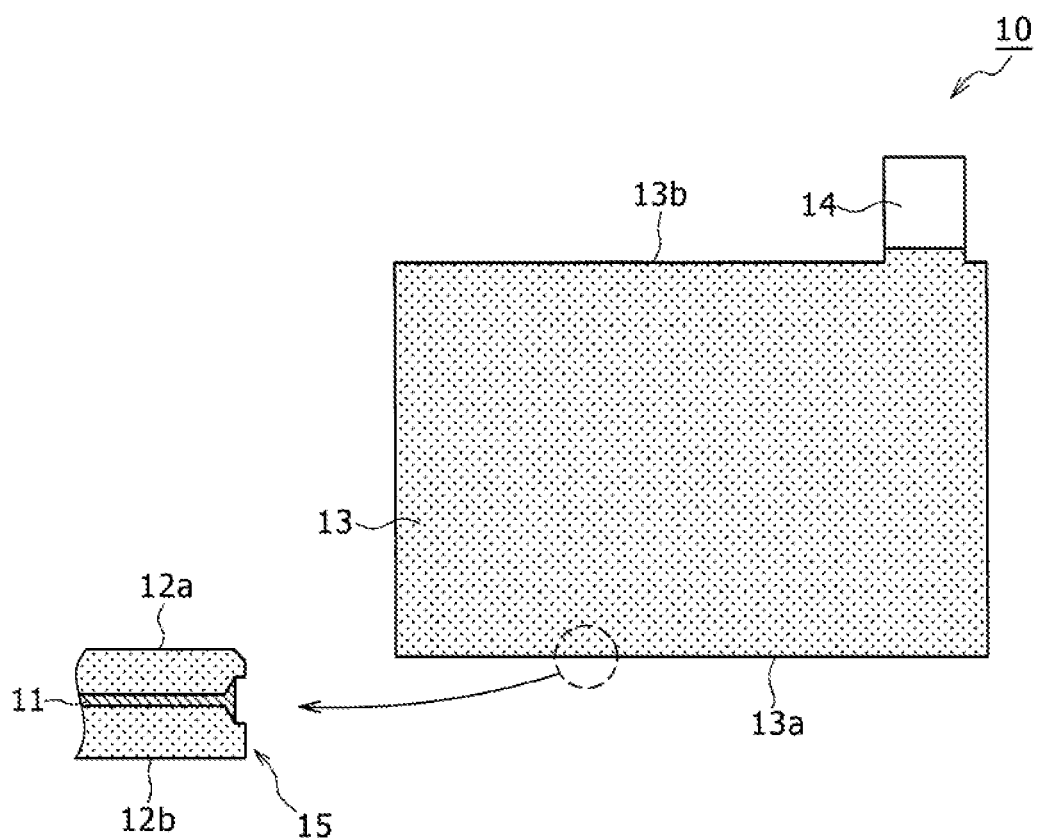
FIG. 1 illustrates a secondary-battery electrode, which is an example of an embodiment.

An example of an embodiment of a secondary-battery electrode according to the present disclosure and an example of an embodiment of a secondary-battery electrode manufacturing method according to the present disclosure are described in detail below with reference to the drawings. The drawings that are referred to in describing the embodiments are schematic drawings, so that the dimensions etc. of structural elements in the drawings may differ from the dimensions etc. of actual structural elements. Specific dimensions etc. should be determined by taking into consideration the following description. In the present description, when "substantially the same" is taken as an example, the term "substantially . . . " is intended to encompass "can be deemed as being practically the same", not to mention "completely the same".

A secondary-battery electrode 10 applied to a multilayer-type electrode body is taken as an example below. However, the secondary-battery electrode according to the present disclosure may be applied to a winding-type electrode body, and the manufacturing method according to the present disclosure may also be applied to the manufacturing of electrodes for the winding-type electrode body.

FIG. 1 is a front view of the secondary-battery electrode 10, which is an example of the embodiment, with a sectional view of an electrode end portion also being provided.

As exemplified in FIG. 1, the secondary-battery electrode 10 includes a thin-plate-shaped core body 11 and active material layers 12 formed on two surfaces of the core body 11. Although an active material layer 12 may be formed on only one of the surfaces of the core body 11, it is desirable that active material layers 12 be formed on two surfaces of the core body 11. Hereunder, when the active material layers 12 formed on the two surfaces of the core body 11 are to be distinguished, the active material layer formed on one of the surfaces of the core body 11 is called "first active material layer 12a", and the active material layer formed on the other surface of the core body 11 is called "second active material layer 12b".

The secondary-battery electrode 10 may be either a positive electrode or a negative electrode. However, as described below, the positive electrode and the negative electrode differ in, for example, the material of the core body 11, the active materials etc. contained in the active material layers 12, and electrode size.

The secondary-battery electrode 10 includes a base portion 13 and a lead portion 14 that protrudes from one end of the base portion 13. In the secondary-battery electrode 10, the base portion 13 and the lead portion 14 are integrally molded with each other. The base portion 13 is a portion where the active material layers 12 are formed, and the active material layers 12 are formed on entire regions of the two surfaces of the core body 11. Although the base portion 13 has a rectangular shape that is long in a lateral direction in front view, the shape is not particularly limited. The lead portion 14 protrudes from a position on a long side portion of the base portion 13 that is close to a short side, and has a rectangular shape in front view. Although, in general, the active material layers 12 are also formed on a joint of the lead portion 14, the active material layers 12 are not formed on a large portion of the lead portion 14.

The base portion 13 of the secondary-battery electrode 10 has a rectangular shape in plan view, and includes two long side portions 13a and 13b that are parallel to each other. The long side portion 13a is linearly formed. As described below, the long side portion 13a is formed by cutting an electrode precursor with a continuous wave laser (CW laser). At a cut end portion 15 of the long side portion 13a, an end portion of the core body 11 widens in an electrode thickness direction, and is positioned inward from an end portion of the active material layer 12a and an end portion of the active material layer 12b. The shape of the cut end portion 15 is described below. The other long side portion 13b of the base portion 13 and the lead portion 14 of the secondary-battery electrode 10 are also formed by cutting the electrode precursor with the continuous wave laser under predetermined conditions.

The secondary-battery electrode 10 is applied to a multilayer-type electrode body. The multilayer-type electrode body includes a plurality of positive electrodes and a plurality of negative electrodes, the positive electrodes and the negative electrodes being alternately stacked via separators. When the secondary-battery electrode 10 is a positive electrode, lead portions 14 of the plurality of positive electrodes that are stacked upon each other via the separators and the negative electrodes are joined to each other by, for example, welding. In addition, the lead portions 14 are connected to a positive-electrode terminal of the battery either directly or via metallic current-collecting members.

Although the secondary battery to which the secondary-battery electrode 10 is applied is, for example, a non-aqueous electrolyte secondary battery, such as a lithium-ion battery, the secondary battery is not limited thereto. Examples of the secondary battery include a square battery having a square metallic case and a laminated battery including an exterior body formed from a metal-layer laminated film. However, other types of batteries may be used. Hereunder, the secondary-battery electrode 10 is described as being applied to a lithium-ion battery.

When the secondary-battery electrode 10 is a positive electrode, for example, a metallic foil, made of a metal, such as aluminum or an aluminum alloy, that is stable in a positive-electrode electrical potential range, or a film on whose surface layer the metal is disposed may be used in the core body 11 (positive-electrode current-collecting body). The thickness of the positive-electrode current-collecting body is, for example, 5 µm to 30 µm. When each active material layer 12 is a positive-electrode mixed material layer, in general, each active material layer 12 contains a positive electrode active material, such as a lithium transition metal oxide, a conductive material, and a binding material. For example, on one side of the positive-electrode current-collecting body, the thickness of the positive-electrode mixed material layers is desirably 20 to 200 µm and is more desirably 50 µm to 150 µm. Although not particularly limited, the conductive material is desirably, for example, a carbon material, and the binding material is desirably, for example, polyvinylidene fluoride.

When the secondary-battery electrode 10 is a negative electrode, for example, a metallic foil, made of a metal, such as copper or a copper alloy, that is stable in a negative-electrode electrical potential range, or a film on whose surface layer the metal is disposed may be used in the core body 11 (negative-electrode current-collecting body). The thickness of the negative-electrode current-collecting body is, for example, 5 µm to 30 µm. When each active material layer 12 is a negative-electrode mixed material layer, in general, each active material layer 12 contains a negative electrode active material, such as a carbon material (for example, natural graphite or artificial graphite), a metal (for example, Si or Sn that forms an alloy with lithium), an alloy, or a composite oxide, and a binding material. For example, on one side of the negative-electrode current-collecting body, the thickness of the negative-electrode mixed material layers is desirably 20 to 200 µm and is more desirably 50 µm to 150 µm. Although not particularly limited, the binding material is desirably, for example, a rubber-based binding material, such as styrene-butadiene rubber.

Figure 2:
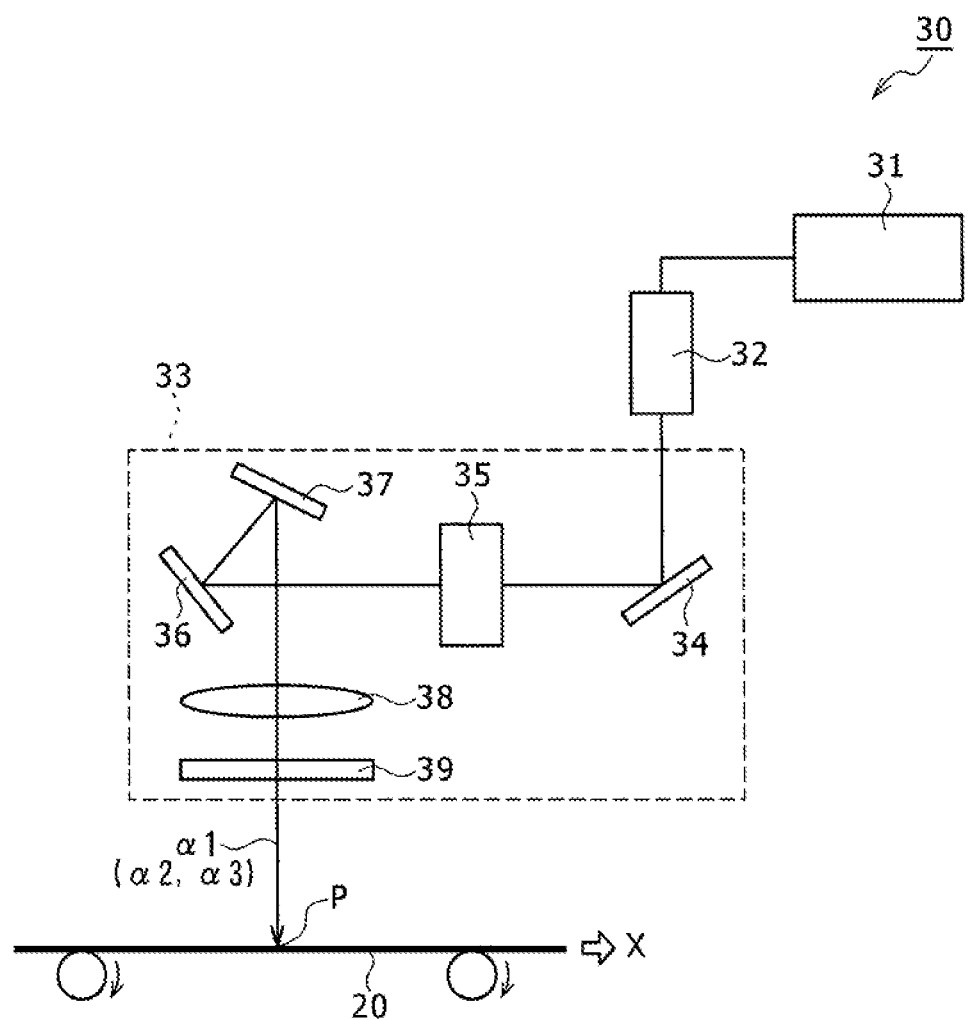
FIG. 2 is an illustration for describing a continuous wave laser used in forming the secondary-battery electrode shown in FIG. 1 by cutting.
Figure 3:
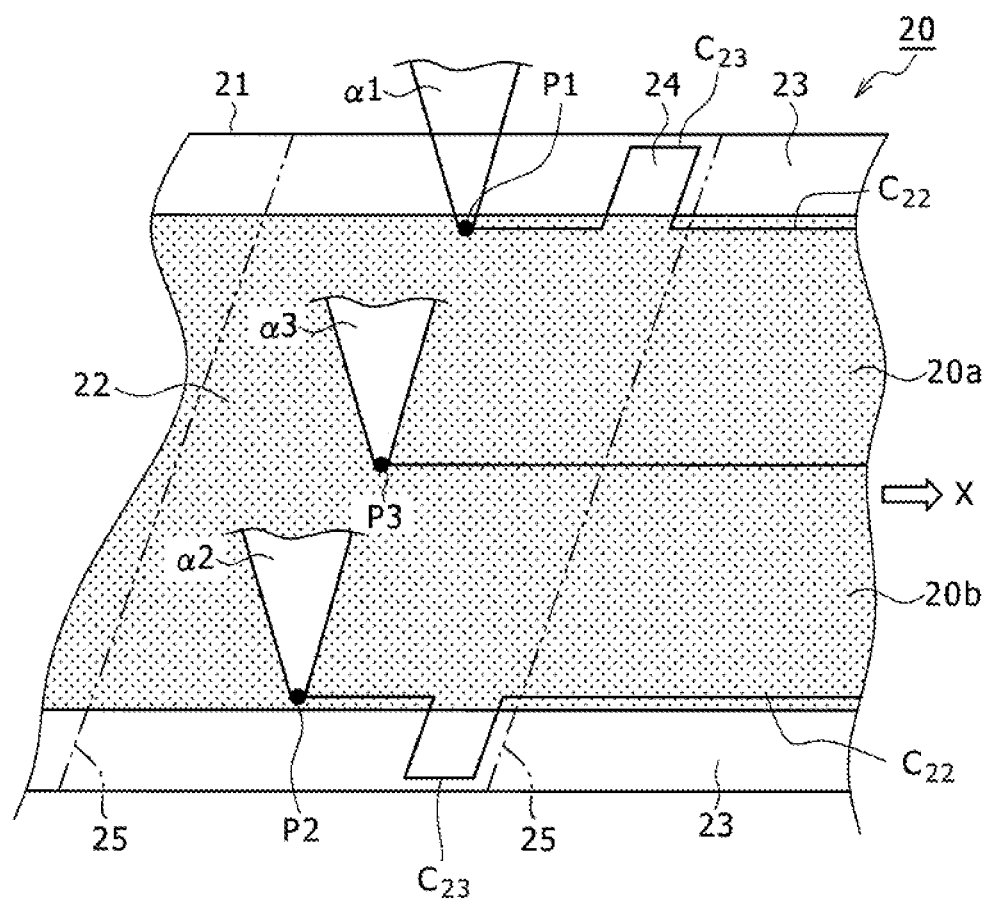
FIG. 3 is a perspective view of a state in which the secondary-battery electrode shown in FIG. 1 is formed by cutting with the continuous wave laser.

Next, with reference to FIGS. 2 and 3, an example of a method of manufacturing the secondary-battery electrode 10 is described in detail. FIG. 2 shows an overall structure of a laser system 30 that is used in manufacturing the secondary-battery electrode 10 of the embodiment. FIG. 3 shows a state in which an electrode precursor 20 is cut by laser beams α output from the laser system 30. Here, a member that becomes the core body 11 of the secondary-battery electrode 10 by cutting the electrode precursor 20 is defined as a long core body 21 and layers that become the active material layers 12 are defined as active material layers 22. In FIGS. 2 and 3, a movement direction of the electrode precursor 20 relative to illumination positions of the laser beams α are indicated by arrow X.

As exemplified in FIGS. 2 and 3, the secondary-battery electrode 10 is manufactured by cutting the long electrode precursor 20 into a predetermined shape, the long electrode precursor 20 having the active material layers 22 formed on two surfaces of the long core body 21. The electrode precursor 20 of the embodiment has the active material layers 22 formed on the two surfaces of the long core body 21. The active material layers 22 are formed by preparing a mixture slurry containing constituent materials of, for example, active materials by applying the slurry to the two surfaces of the long core body 21, and by drying the applied films.

In the step of forming the active material layers 22, exposed portions 23, where surfaces of the core body are exposed, are formed in a longitudinal direction of the electrode precursor 20. It is desirable that the exposed portions 23 be formed with a substantially constant width from two respective ends of the long core body 21 in a width direction. Although the exposed portions 23 may be formed by, after forming the active material layers 22 on entire regions of the two respective surfaces of the long core body 21, peeling off and removing a part of each active material layer 22, it is desirable that the exposed portions 23 be formed without applying a mixture slurry to a part of the long core body 21.

As shown in FIG. 3, the long core body 21 has a width that allows two secondary-battery electrodes 10 to be formed in the width direction orthogonal to the longitudinal direction. Therefore, in the laser system 30 of the present embodiment, the electrode precursor 20 is cut by using three laser beams α1, α2, and α3. More specifically, the laser beams α1 and α2 illuminate the two end sides of the electrode precursor 20 in the width direction to form long side portions 13$b$, including lead portions 14, of base portions 13 of the secondary-battery electrodes 10. The laser beam α3 illuminates the center of the electrode precursor 20 in the width direction to cut the electrode precursor 20 into two electrode intermediate bodies 20$a$ and 20$b$.

In the step of cutting the electrode precursor 20, while changing the position of the electrode precursor 20 and the position of a processing head of the laser system 30 relative to each other, the laser beams α1 to α3 illuminate the electrode precursor 20. Although the laser beams α1 to α3 are capable of scanning the electrode precursor 20 while the electrode precursor 20 is fixed, when the long electrode precursor 20 is to be processed, it is desirable to perform the cutting operation while transporting the electrode precursor 20. The laser beams α1 to α3 may scan the electrode precursor 20 while the electrode precursor 20 is transported.

FIG. 2 shows an example of the laser system 30 that outputs the laser beam α1 that illuminates one end side of the electrode precursor 20 in the width direction. The laser system that outputs the laser beam α2 and the laser system that outputs the laser beam α3 may have the same structure.

As shown in FIG. 2, the laser system 30 includes a laser oscillator 31 and the processing head that has a galvanometer scanner 33 built therein. By using the galvanometer scanner 33, the laser α1 is capable of scanning the electrode precursor 20 while the processing head itself is fixed. The laser oscillator 31 is an oscillator capable of continuous oscillation. Examples of the laser oscillator 31 include a YAG laser, a $CO_2$ laser, an Ar laser, and a fiber laser, which are capable of outputting the laser beam α1 in a continuous oscillation mode. A desirable example is the fiber laser. An example of a desired range of oscillation wavelength is 900 nm to 1200 nm. In the laser system 30, a collimator 32 that forms the laser beam α1 output from the laser oscillator 31 into a parallel beam is provided between the laser oscillator 31 and the galvanometer scanner 33.

The galvanometer scanner 33 includes a reflecting mirror 34, an optical element 35, an X-axis mirror 36, a Y-axis mirror 37, and an Fθ lens 38 in that order from the side of the laser oscillator 31. For example, a diffraction grating or the like is used for the optical element 35. The laser beam α1, which is a continuous wave, that has passed through the collimator 32 is bent towards the side of the optical element 35 by the reflecting mirror 34, passes through the optical element 35, and is guided to the X-axis mirror 36 and the Y-axis mirror 37. By moving the X-axis mirror 36 and the Y-axis mirror 37, the laser beam α1 performs a scanning operation to allow the position of an illumination spot P1 to change in a two-dimensional plane. The laser beam α1 reflected by the X-axis mirror 36 and the Y-axis mirror 37 passes through the Fθ lens 38 and a protective glass 39, and illuminates the electrode precursor 20.

It is desirable that laser illumination conditions be adjusted on the basis of, for example, the material, the thickness, and the cutting shape of the long core body 21 and the active material layers 22. However, in general, the output of the continuous wave laser (the laser oscillator 31) is 500 W to 5000 W, and the spot diameter of the laser beam α1 is 5 μm to 100 μm. The cutting speed of the electrode precursor 20 by the continuous wave laser is, for example, 500 mm/s to 8000 mm/s. The illumination conditions when the electrode precursor 20 is a positive-electrode precursor and the illumination conditions when the electrode precursor 20 is a negative-electrode precursor may differ from each other. In general, the positive-electrode precursor is easier to cut.

Examples of desirable ranges regarding the laser output, the spot diameter, and the cutting speed are as follows. It is more desirable that the laser output be 1000 W to 3000 W. The spot diameter is desirably 10 μm to 100 μm, and is more desirably 10 μm to 40 μm. It is more desirable that the cutting speed be 1000 mm/s to 5000 mm/s.

Here, the outputs of the laser beams α1, α2, and α3 that illuminate the electrode precursor 20 may be the same. However, the laser beams α1 and α2 that illuminate the two respective end sides of the electrode precursor 20 in the width direction include regions where only the exposed portions 23 of the core body 11 are cut (that is, external shape lines of protruding portions 24 that become the lead portions 14). Compared to regions where the active material layers 22 exist, the exposed portions 23 are capable of being cut even if the outputs of the laser beams are low. When the laser outputs are too high, peripheral edge portions of the protruding portions 24, which become the lead portions 14, may have roughly cut surfaces. Therefore, the outputs of the laser beams α1 and α2 may be set lower than the output of the laser beam α3 that cuts only the regions where the active material layers 22 exist.

As exemplified in FIG. 3, in the step of cutting the electrode precursor 20, by using the continuous wave laser, portions of the electrode precursor 20 where the active material layers 22 are provided are cut along the exposed portions 23 and a cutting direction is changed at a substantially constant period to cut the exposed portions 23, so that the protruding portions 24, which become the lead portions 14, are formed. Although the laser beams α1 and α2 are each capable of illuminating a boundary position between a portion where the active material layers 22 are provided and the corresponding exposed portion 23, in this case, a slight displacement of the illumination spot P1 or a slight displacement of an illumination spot P2 causes an exposed surface of the core body 11 to be formed on a portion other than the corresponding lead portion 14. Since each exposed surface of the core body 11 on a portion other than the corresponding lead portion 14 may cause a low-resistance short circuit to occur between the positive and negative electrodes, it is desirable that the electrode precursor 20 be cut so as not to form the corresponding exposed portion at, in particular, each positive electrode. Therefore, it is desirable that the electrode precursor 20 be cut by applying the laser beams α1 and α2 to portions near the exposed portions 23 in the portions where the active material layers 22 are provided.

The laser beams α1 and α2 scan portions along the exposed portions 23 (in the longitudinal direction of the electrode precursor 20), and each scan the side of the corresponding exposed portion 23 at a portion corresponding to the protruding portion 24 (in the width direction of the electrode precursor 20). At this time, the laser beam α1 and the laser beam α2 scan the portions in opposite directions to each other. Since the laser beam α1 continuously illuminates even the boundary position between the portion where the active material layers 22 are provided and the corresponding exposed portion 23 and the laser beam α2 continuously illuminates even the boundary position between the portion where the active material layers 22 are provided and the corresponding exposed portion 23, each cut portion $C_{22}$ of the portion where the active material layers 22 are provided and its corresponding cut portion $C_{23}$ of the exposed portion 23 are formed in one continuous line. By changing the cutting direction at a substantially constant period and cutting the exposed portions 23, a plurality of protruding portions 24 that are disposed side by side at a substantially equal interval in the longitudinal direction of the electrode precursor 20 are formed. Then, the secondary-battery electrodes 10 including the base portion 13 on whose entirety the active material layers 12 are formed and the lead portion 14 on whose joint the active material layers 12 are formed is acquired.

In the present embodiment, the electrode precursor 20 is cut into electrode sizes by using the continuous wave laser. As described above, since the long core body 21 has a width that allows two secondary-battery electrodes 10 to be formed in the width direction, the laser beam α3 illuminates the center of the electrode precursor 20 in the width direction to cut the electrode precursor 20 in the longitudinal direction. Therefore, two long electrode intermediate bodies 20a and 20b formed by cutting to the widths corresponding to the widths of the secondary-battery electrodes 10 are acquired. Since the center of the electrode precursor 20 in the width direction is linearly cut by the laser beam α3, the laser beam α3 may be one capable of scanning the electrode precursor 20 one-dimensionally. Therefore, in the laser system that outputs the laser beam α3, for example, the Y-axis mirror 37 need not be used or may be fixed.

The electrode intermediate bodies 20a and 20b that are separated into two bodies by using the continuous wave laser as described above may be supplied to a step of compressing the active material layers 22. After the compressing step, by separating the electrode intermediate bodies 20a and 20b along scheduled separation lines 25, individual secondary-battery electrodes 10 are acquired. The separation into the individual secondary-battery electrodes 10 may be performed by using the continuous wave laser or by an existing general cutting method using a cutter or the like.

In FIG. 3, the example in which three laser beams α1, α2, and α3 are applied side by side in the width direction of the electrode precursor 20 is described. However, other examples are possible. The illumination position of at least one of the laser beams α1, α2, and α3 may be displaced in the movement direction (arrow X) of the electrode precursor 20.

Figure 4:
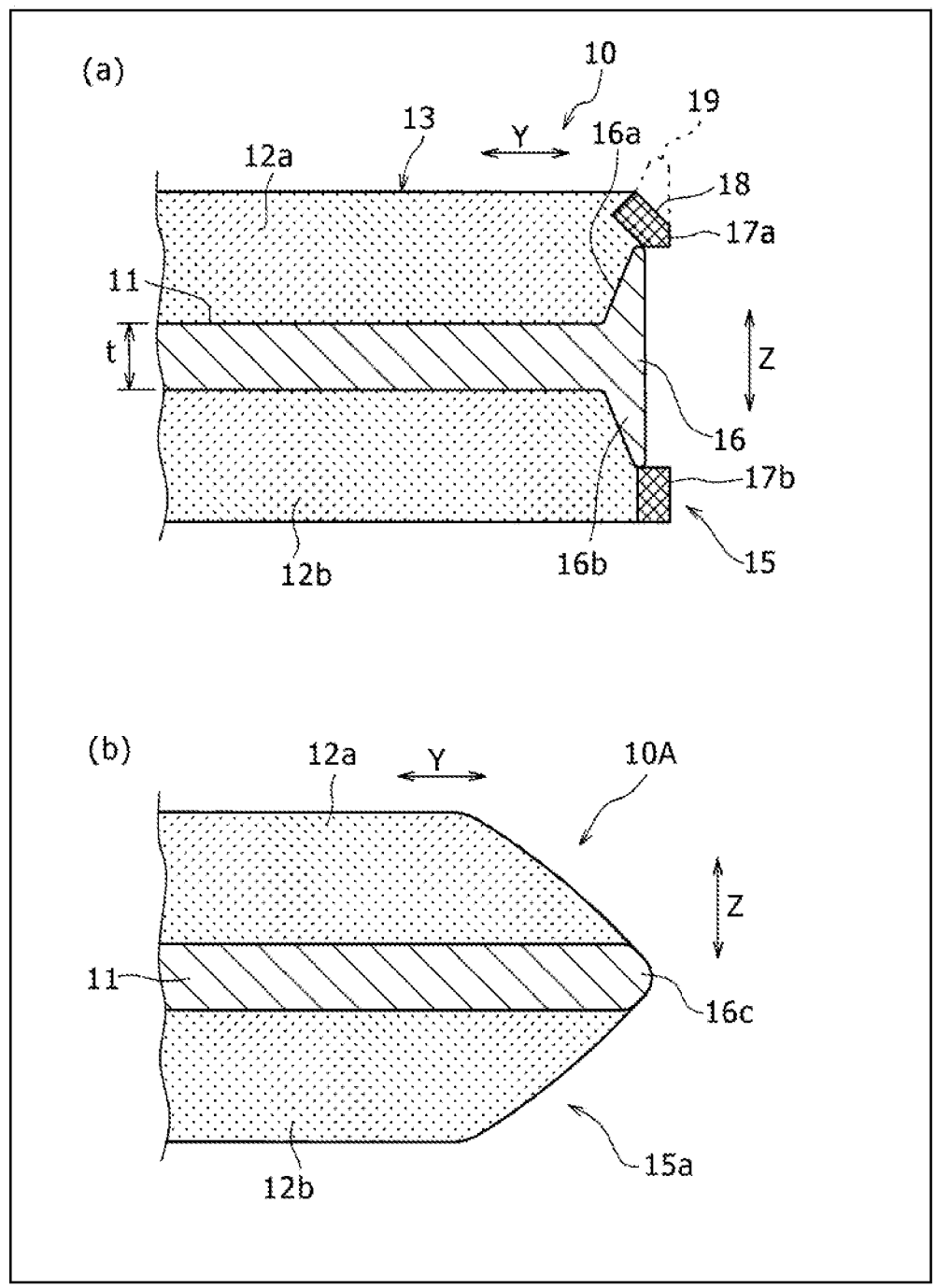
FIG. 4 is an enlarged sectional view of a cut end portion of the secondary-battery electrode, (a) showing a case in which the cut end portion is formed by cutting with the continuous wave laser and (b) showing a case in which the cut end portion is formed by cutting with a pulse laser.

FIG. 4 is an enlarged section view of the cut end portion of the secondary-battery electrode, FIG. 4(a) showing a case in which the cut end portion is formed by cutting with the continuous wave laser and FIG. 4(b) showing a case in which the cut end portion is formed by cutting with a pulse laser. In FIGS. 4(a) and 4(b), a surface direction of the secondary-battery electrode 10 (that is, a direction along a surface of each active material layer 12) is denoted by arrow Y and a direction orthogonal to the surface direction of the secondary-battery electrode 10 (that is, a thickness direction of the secondary-battery electrode 10) is denoted by arrow Z.

As mentioned above, it is desirable to cut the electrode precursor 20 under predetermined conditions by using the continuous wave laser and form the long side portions 13a and 13b (see FIG. 1) of the base portion 13 of the secondary-battery electrode 10 into cut end portions 15 like the one shown in FIG. 4(a). Specifically, in the cut end portion 15, an end portion 16 of the core body 11 is positioned inward of an end portion 17a of the first active material layer 12a and an end portion 17b of the second active material layer 12b in the surface direction Y. In other words, the end portion 17a of the first active material layer 12a in the surface direction Y and the end portion 17b of the second active material layer 12b in the surface direction Y protrude towards an outer side in the surface direction Y. The protruding amount of the end portion 17a of the first active material layer 12a in the surface direction Y from the end portion 16 of the core body 11 and the protruding amount of the end portion 17b of the second active material layer 12b in the surface direction Y from the end portion 16 of the core body 11 are desirably 0 μm to 100 μm, more desirably, 0 μm to 20 μm, and even more desirably, 3 μm to 20 μm. In the cut end portion 15, the end portion 16 of the core body 11 includes substantially triangular portions 16a and 16b that are wider than a plate thickness t of the core body 11 in the thickness direction Z. An inner side surface of the substantially triangular portion 16a is covered by the first active material layer 12a, and an inner side surface of the substantially triangular portion 16b is covered by the second active material layer 12b. Here, "inner side" in the surface direction Y means a side where a portion that becomes the base portion 13 exists with the cut end portion 15 as a boundary, and "outer side" in the surface direction Y means a side opposite thereto (that is, a side where the portion that becomes the substrate base portion 13 does not exist).

The end portion 16 of the core body 11 is positioned inward of the end portion 17a of the first active material layer 12a and the end portion 17b of the second active material layer 12b in this way because the outputs of the laser beams α1 to α3 by the continuous wave laser are high at, for example, 1000 to 3000 W. More specifically, when the laser beams illuminate the electrode precursor 20 and locally heat the electrode precursor 20, first, the first active material layer 12a is removed (abraded). Then, the heating by the laser beams reaches the core body 11, made of a metallic foil, and melts and cuts the core body 11. Thereafter, the second active material layer 12b is removed by the laser beams that have passed through the core body 11. This causes the electrode precursor 20 to be cut.

When the core body 11 is melted and cut as described above, since the laser outputs are high, the molten state of the core body 11, made of a metallic foil having a high heat transfer performance, becomes a widened state instantaneously in the surface direction Y. The molten metal that forms the end portion 16 of the core body 11 tries to become round due to the influence of, for example, surface tension.

Therefore, it is inferred that the surface of the end portion 16 of the core body 11 is formed into a recessed state on the inner side of the end portion 17a of the first active material layer 12a and the end portion 17b of the second active material layer 12b. When the end portion 16 of the molten core body 11 tries to become round, the first active material layer 12a and the second active material layer 12b prevent the end portion 16 from becoming round. As a result, it is inferred that the portions 16a and 16b that are widened into substantially triangular shapes are formed on two sides of the end portion 16 of the core body 11 in the thickness direction Z. Since the end portion 16 of the core body 11 includes the widened portions 16a and 16b in this way, at the cut end portion 15, the first active material layer 12a and the second active material layer 12b are held down and are less likely to come off the core body 11.

As shown in FIG. 4(a), at the cut end portion 15, the end portion 17a of the first active material layer 12a and the end portion 17b of the second active material layer 12b that protrude towards the outer side in the surface direction Y than the end portion 16 of the core body 11 are each a melted-and-solidified portion formed by solidifying a temporary molten active material. In FIG. 4(a), the melted-and-solidified portion of each active material layer is denoted by cross-hatching.

Although FIG. 4(a) shows the example in which the end portion 17a of the first active material layer 12a and the end portion 17b of the second active material layer 12b are aligned in the thickness direction Z, other examples are possible. The protruding dimensions of the end portions 17a and 17b in the surface direction Y may differ from each other. Although, in the present embodiment, the example in which, at the cut end portion 15, the end portion 16 of the core body 11 is positioned inward of the first active material layer 12a and the second active material layer 12b is described, other examples are possible. At the cut end portion 15, the end portion 16 of the core body 11 may be flush with the end portion 17a of the first active material layer 12a and the end portion 17b of the second active material layer 12b (that is, aligned with each other in the thickness direction Z). That is, the end portion 16 of the core body 11 does not protrude towards the outer side in the surface direction Y with respect to the end portion 17a of the first active material layer 12a and the end portion 17b of the second active material layer 12b.

As shown in FIG. 4(a), a corner portion 18 of the melted-and-solidified portion that forms the end portion 17a of the first active material layer 12a is chamfered. Specifically, the corner portion 18 is formed with, for example, a surface inclined by approximately 40 degrees to 60 degrees with respect to the thickness direction Z. The corner portion 18 is chamfered to, when the electrode precursor 20 is cut by using a laser, remove a protrusion 19 as the melted-and-solidified portion at the corner portion of the cut end portion. When a secondary battery is formed by stacking positive electrodes and negative electrodes, such a protrusion 19 may cause a short circuit by breaking and falling or by coming into contact with an adjacent electrode. Therefore, it is desirable that the protrusion 19 be removed by such chamfering. The protrusion 19 described above is less likely to be formed on a corner portion of the second active material layer 12b. Therefore, in the present embodiment, the corner portion of the second active material layer 12b is not chamfered. However, as with the corner portion 18 of the first active material layer 12a, the corner portion of the second active material layer 12b may also be chamfered.

FIG. 4(b) shows a cut end portion 15a of a secondary-battery electrode 10A, which is a comparative example, formed by a pulse laser. In the cut end portion 15a, an end portion 16 of a core body 11 is formed into a protruded state towards the outer side in the surface direction Y. A case in which, when an electrode precursor is cut by using a pulse laser, the cut end portion 15a described above is formed is described in the aforementioned Patent Documents 1 and 2. When the secondary-battery electrode 10A shown in FIG. 4(b) is used as a positive electrode, since an end portion 16c of the core body 11 protrudes and is exposed, a short circuit tends to occur as a result of the secondary-battery electrode 10A coming into contact with an adjacent stacked negative electrode. In addition, when the end portion 16c of the core body 11 is exposed, lithium salt accumulates on the exposed end portion 16c and the lithium-ion concentration in an electrolyte is reduced, as a result of which battery output is reduced. In contrast, as described above, in the secondary-battery electrode 10 of the present embodiment, by forming the end portion 15 of the core body 11 so as to be positioned inward (or so as to be recessed), such a problem described above can be overcome or suppressed.

Figure 5:
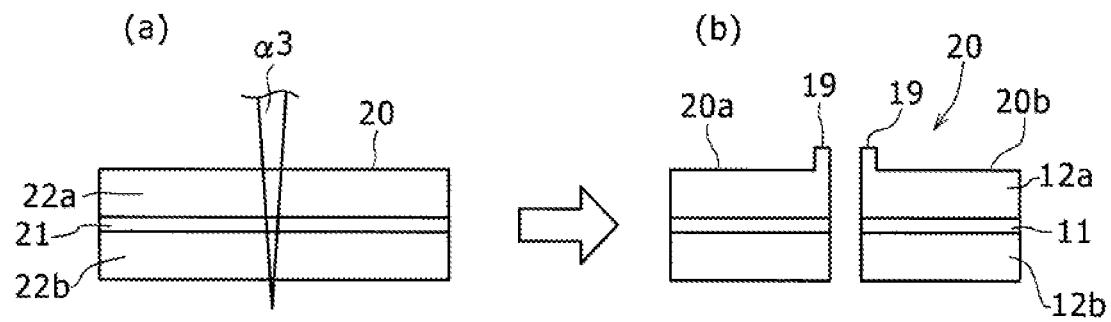
FIG. 5 is an illustration for describing a state in which, when an electrode precursor has been cut with a laser, protrusions of active material layers are formed on corner portions of cut end portions.

FIG. 5 is an illustration for describing a state in which, when the electrode precursor 20 has been cut by using the continuous wave laser, protrusions 19 of active material layers are formed on corner portions of cut end portions. When the center of the electrode precursor 20 in the width direction is cut by being illuminated with the laser beam α3 by the continuous wave laser, as shown in FIG. 5, the protrusions 19, each of which is a part of the melted-and-solidified portion of the active material, are formed on the cut end portions 15 of two separated electrode intermediate bodies 20a and 20b. When such protrusions 19 remain, problems, such as a short circuit at the secondary battery, occur as mentioned above. Therefore, in the secondary-battery electrode manufacturing method according to the present embodiment, the protrusions 19 are removed by the continuous wave laser.

Figure 6:
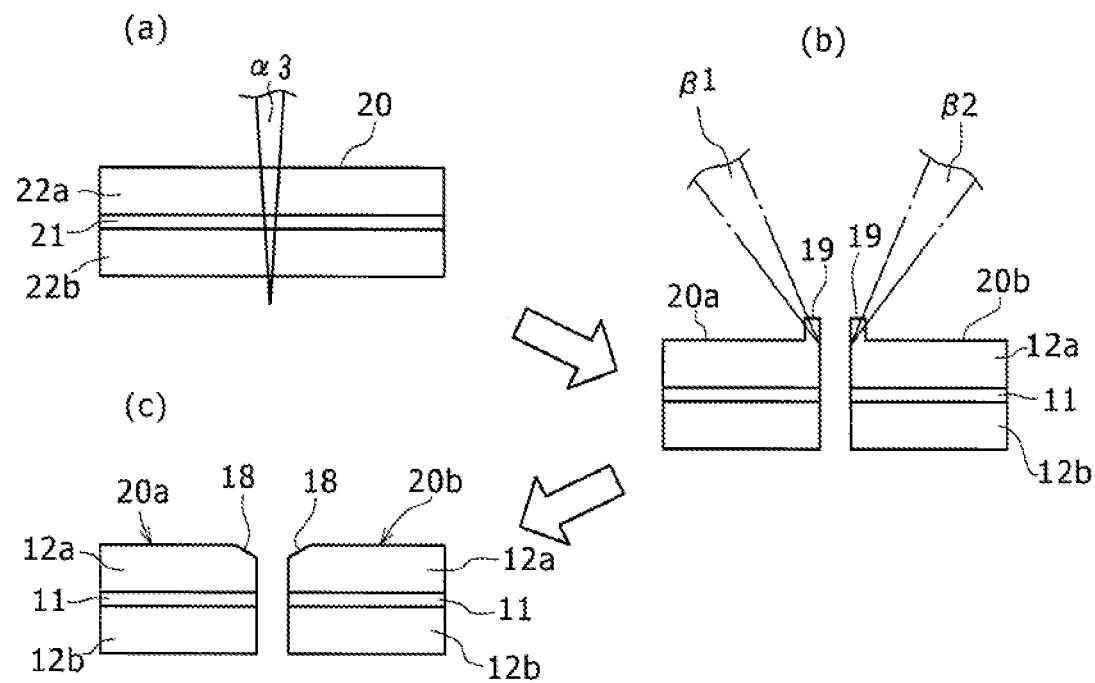
FIG. 6 is an illustration for describing an example of a secondary-battery electrode manufacturing method according to an embodiment.

FIG. 6 is an illustration for describing an example of the secondary-battery electrode manufacturing method according to the embodiment. In a first step of the manufacturing method, as shown in FIG. 6(a), the electrode precursor 20 including the thin-plate-shaped long core body 21, which becomes the core body 11 of the secondary-battery electrode 10, and the first active material layer 22a and the second active material layer 22b, formed on the two respective surfaces of the long core body 21, is cut by a laser beam α3 that is a continuous wave laser beam (first continuous wave laser). Therefore, as shown in FIG. 6(b), the long strip-shaped electrode precursor 20 is cut into two electrode intermediate bodies 20a and 20b. Protrusions 19, each being a part of the melted-and-solidified portion formed by melting and solidifying the active material that forms the first active material layer 22a, are formed on the corner portions of the cut end portions 15 of the respective electrode intermediate bodies 20a and 20b.

Next, in a second step, the protrusions 19 of the active material layers 12a, formed on the corner portions of the cut end portions 15 of the two respective electrode intermediate bodies 20a and 20b, are removed by laser beams β1 and β2 that are continuous wave laser beams. In the present embodiment, on a front side in a movement direction of the electrode intermediate bodies 20a and 20b that move relative to an illumination position of the laser α3, the laser beams β1 and β2 illuminate the corner portions 18 of the cut end portions 15 of the respective electrode intermediate bodies 20a and 20b.

For the laser beams β1 and β2, laser beams emitted from a laser system that is the same as the laser system that emits the laser beam α3, for example, a laser beam split by, for example, a beam splitter may be used. Alternatively, a laser beam generated by a laser system that differs from the laser system that generates the laser beam α3 may be split into two laser beams and formed as the laser beams β1 and β2. This similarly applies to a manufacturing method shown in FIG. 7.

In the present embodiment, the laser beams β1 and β2 may illuminate the protrusions 19 from obliquely above the protrusions 19 at a predetermined angle θ (<90 degrees) with respect to the first active material layer 12a, instead of from directly above the protrusions 19 as with the laser beam α3. Therefore, as shown in FIG. 6(c), the protrusions 19 are removed and the corner portions 18 of the cut end portions 15 are chamfered.

Figure 7:
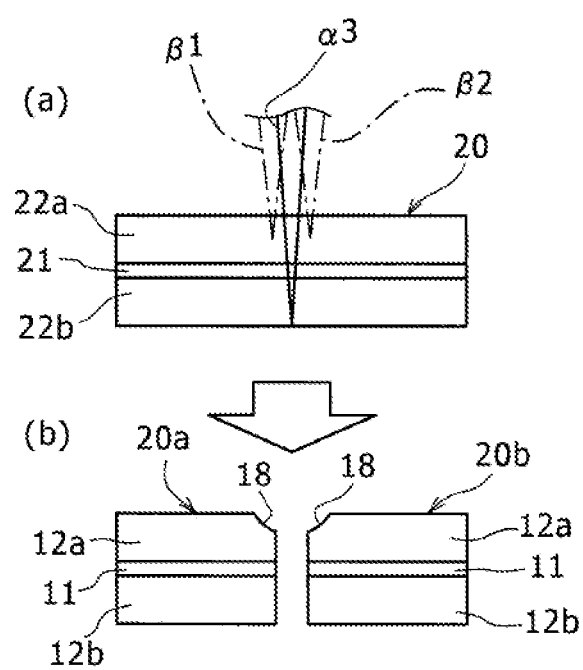
FIG. 7 is an illustration for describing a different example of the secondary-battery electrode manufacturing method according to an embodiment.

FIG. 7 is an illustration for describing a different example of the secondary-battery electrode manufacturing method according to an embodiment. As shown in FIG. 7(a), in the present embodiment, at positions that correspond with the illumination position of the laser beam α3 in the first step in the movement direction of the electrode precursor 20, the two lasers β1 and β2 in the second step illuminate the corner portions 18 of the cut end portions 15 of the respective electrode intermediate bodies 20a and 20b. In other words, the two laser beams β1 and β2 illuminate the positions on two respective sides of the laser beam α3 in the width direction of the electrode precursor 20. In the example shown in FIG. 7(a), as with the laser beam α3, the two laser beams β1 and β2 perpendicularly illuminate the electrode precursor 20 from directly above the electrode precursor 20. Therefore, the corner portions 18 of the cut end portions 15 are chamfered before protrusions 19 are formed. Even in the present embodiment, since protrusions are not formed on the corner portions 18 of the cut end portions 15, it can be said that the protrusions are removed.

At portions of the electrode precursor 20 on the sides of end portions of the electrode precursor 20 in the width direction to be cut by the laser beams α1 and α2, only the protrusions 19 that are formed on the cut end portions on the sides that become the secondary-battery electrodes 10 need to be removed, and protrusions on the opposite side (that is, on the sides including the exposed portions 23) may remain. Therefore, in this case, only one of the two laser beams β1 and β2 shown in FIGS. 6 and 7 need to be used.

As described above, according to the secondary-battery electrode 10 of the present embodiment, since, at the cut end portion 15, the end portion 16 of the core body 11 is positioned inward, when the secondary-battery electrode 10 is used in a secondary-battery multilayer-type electrode body, a short circuit between adjacent positive and negative electrodes can be suppressed.

According to the manufacturing method according to the present embodiment, since the electrode precursor 20 is cut by using the continuous wave laser, the electrode precursor 20 is capable of being cut at a higher speed than when the electrode precursor 20 is cut by using a pulse laser. As a result, the productivity of the secondary-battery electrode 10 is greatly increased.

A structure of a secondary battery 100 using the secondary-battery electrode 10 is hereunder described with reference to FIG. 8.

Figure 8:
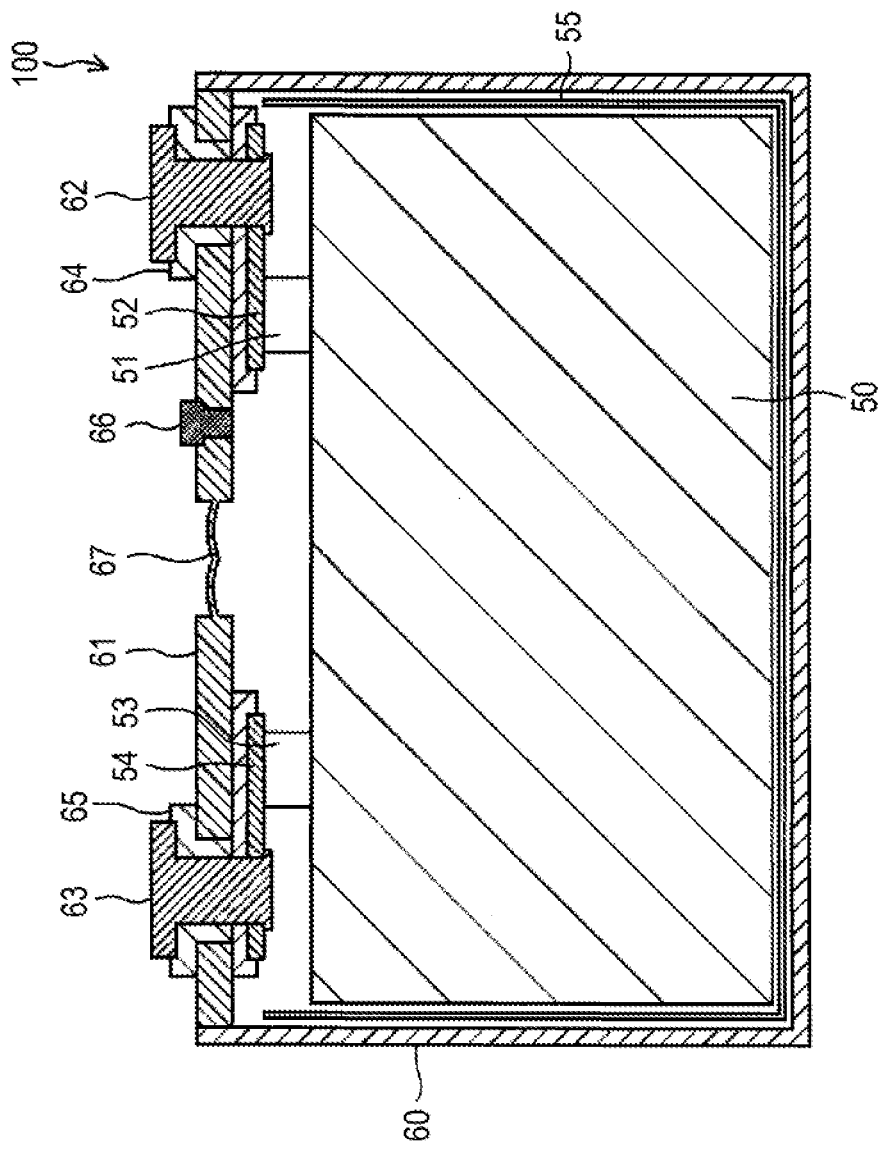
FIG. 8 is a sectional view of a secondary battery, which is an example of an embodiment.

As shown in FIG. 8, in the secondary battery 100, an electrode body 50 in which a plurality of positive electrodes and a plurality of negative electrodes are alternately stacked upon each other via separators is, along with an electrolyte (not shown), accommodated in a battery case 60. Here, as the positive and negative electrodes, secondary-battery electrodes 10 are used. An opening portion of the battery case 60 is sealed by a sealing body 61. A positive-electrode terminal 62 and a negative-electrode terminal 63 are fixed to the sealing body 61 via resin members 64 and 65, respectively. The positive electrodes are electrically connected to the positive-electrode terminal 62 via a positive-electrode lead portion 51 and a positive-electrode current-collecting member 52. The negative electrodes are electrically connected to the negative-electrode terminal 63 via a negative-electrode lead portion 53 and a negative-electrode current-collecting member 54. A liquid injection hole for injecting the electrolyte is provided in the sealing body 61. After injecting the electrolyte, the liquid injection hole is sealed by a sealing member 66. The sealing body 61 is provided with a gas discharge valve 67 that releases pressure when the internal pressure of the battery case 60 has been raised. When the battery case 60 is made of a metal, it is desirable that the electrode body 50 be disposed in the battery case 60 with the electrode body 50 disposed in an insulating sheet 55 in the form of a box or a bag.

It is desirable that the positive-electrode lead portion 51 protruding from each positive electrode be curved and be connected to a portion of the positive-electrode current-collecting member 52 disposed substantially parallel to the sealing body 61. It is desirable that the negative-electrode lead portion 53 protruding from each negative electrode be curved and be connected to a portion of the negative-electrode current-collecting member 54 disposed substantially parallel to the sealing body 61. Therefore, a secondary battery having a higher volumetric energy density is provided.

It is desirable that the positive electrodes and the negative electrodes manufactured by the above-described method be adhered to each other by separators disposed between the positive electrodes and the negative electrodes. As the adhering method, it is desirable that an adhesion layer be formed on a surface of each separator made of, for example, polyolefin, such as polypropylene or polyethylene, or on a surface of each active material layer of each electrode, and that the separators and the active material layers be adhered to each other by the adhesion layers. It is desirable that the adhesion be, for example, pressure bonding or thermal welding. Although the adhesion layers are not particularly limited, it is desirable that the adhesion layers be layers that are softer than the separators. The adhesion layers are desirably made of a resin for which, for example, polyvinylidene fluoride, carboxymethyl cellulose, or polyvinyl alcohol may be used.

When the active material layers and the separators are to be adhered to each other by the adhesion layers, it is desirable that the adhesion layers contact the melted-and-solidified portions. This makes it possible to prevent the melted-and-solidified portions from sliding down from the active material layers when using the secondary battery.

<Other>

As a method of manufacturing positive electrodes or negative electrodes using a winding-type electrode body in which long positive electrodes and long negative electrodes are wound via separators, it is possible to apply the secondary-battery electrode manufacturing method according to the present disclosure. In this case, it is desirable that, at a side of one of the end portions in a direction of extension of a winding axis of the winding-type electrode body, a plurality of positive-electrode lead portions that are provided at the positive electrodes and a plurality of negative-electrode lead portions that are provided at the negative electrodes be disposed. Therefore, a secondary battery having a higher volumetric energy density is provided. It is desirable that, instead of being formed at equal intervals, the plurality of positive-electrode lead portions that are provided at the long positive electrodes be formed at different intervals such that the plurality of positive-electrode lead portions are stacked in the winding-type electrode body. This also applies to the positions of formation of the plurality negative-electrode lead portions that are provided at the long negative electrodes.

REFERENCE SIGNS LIST 10 secondary-battery electrode
11 core body
12, 22 active material layer
12*a*, 22*a* first active material layer
12*b*, 22*b* second active material layer
13 base portion
13*a*, 13*b* long side portion
14 lead portion
15 cut end portion
16 end portion (of core body)
17*a*, 17*b* end portions (of first and second active material layers)
18 corner portion
19 protrusion
20 electrode precursor
20*a*, 20*b* electrode intermediate body (electrode precursor)
21 long core body
23 exposed portion
24 protruding portion
30 laser system
31 laser oscillator
32 collimator
33 galvanometer scanner
34 reflecting mirror
35 optical element
36 X-axis mirror
37 Y-axis mirror
38 Fθ lens
39 protective glass
100 secondary battery
$C_{22}$, $C_{23}$ cut portion
α1, α2, α3, β1, β2 laser beam
P1, P2, P3 illumination spot

The invention claimed is:

1. A secondary-battery electrode comprising a thin-plate-shaped core body and an active material layer formed on at least one surface of the core body, wherein, at an end portion of the electrode, an end portion of the core body is positioned inward of an end portion of the active material layer in a surface direction of the electrode which is perpendicular to a thickness direction of the electrode, or is flush with the end portion of the active material layer, and wherein the end portion of the core body includes a widened portion that is wider than a plate thickness of the core body in the thickness direction of the electrode.

2. The secondary-battery electrode according to claim 1, wherein the widened portion of the end portion of the core body is covered by a melted-and-solidified portion in which the active material layer is melted and solidified.

3. The secondary-battery electrode according to claim 2, wherein a corner portion of the melted-and-solidified portion is chamfered.

4. The secondary-battery electrode according to claim 2, wherein the active material layer is formed on each of two, opposite surfaces of the core body including the at least one surface of the core body and another surface of the core body, wherein a corner portion of the melted-and-solidified portion of the active material layer formed on the at least one surface of the core body is chamfered, and wherein a corner portion of the melted-and-solidified portion of the active material layer formed on the another surface of the core body is not chamfered.

5. A secondary battery comprising the secondary-battery electrode according to claim 1.

6. A secondary-battery electrode manufacturing method, comprising:

a first step of cutting an electrode precursor by a first continuous wave laser, the electrode precursor including a thin-plate-shaped long core body that becomes a core body of the secondary-battery electrode, and an active material layer formed on at least one surface of the thin-plate-shaped long core body; and a second step of removing a protrusion of the active material layer by a second continuous wave laser, the protrusion being formed on a corner portion of a cut end portion of the electrode precursor that has been cut by the first continuous wave laser so as to form at the cut end portion of the electrode, an end portion of the core body is positioned inward of an end portion of the active material layer in a surface direction of the electrode which is perpendicular to a thickness direction of the electrode, or is flush with the end portion of the active material layer, and wherein the end portion of the core body includes a widened portion that is wider than a plate thickness of the core body in the thickness direction of the electrode.

* * * * *